US012760196B2

(12) United States Patent
Takaori

(10) Patent No.: US 12,760,196 B2
(45) Date of Patent: Oct. 13, 2026

(54) INKJET INK SET, INKJET RECORDING APPARATUS, AND INKJET RECORDING METHOD

(71) Applicant: KYOCERA DOCUMENT SOLUTIONS INC., Osaka (JP)

(72) Inventor: Yasuko Takaori, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 158 days.

(21) Appl. No.: 18/813,137

(22) Filed: Aug. 23, 2024

(65) Prior Publication Data

US 2026/0055290 A1 Feb. 26, 2026

(51) Int. Cl.
*C09D 11/40* (2014.01)
*B41J 2/01* (2006.01)
(Continued)

(52) U.S. Cl.
CPC ................. *C09D 11/40* (2013.01); *B41J 2/01* (2013.01); *B41J 2/2107* (2013.01); (Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102;
(Continued)

(56) References Cited

U.S. PATENT DOCUMENTS

2011/0181646 A1* 7/2011 Okuda ........................ B41J 2/21
347/14
2019/0292391 A1* 9/2019 Seguchi ................. B41M 7/009
(Continued)

FOREIGN PATENT DOCUMENTS

JP 2003313468 A 11/2003

*Primary Examiner* — Manish S Shah
(74) *Attorney, Agent, or Firm* — Li & Cai Intellectual Property (USA) Office

(57) ABSTRACT

An inkjet ink set includes: a first ink; and a second ink. The first ink includes a first pigment, a first binder resin particle, and a first aqueous medium. The second ink includes a second pigment, a second binder resin particle, and a second aqueous medium. The first binder resin particle includes a polyolefin resin. A breaking elongation of the first binder resin particle at 25° C. is greater than 60% and 750% or less. The second binder resin particle includes a urethane resin. A breaking elongation of the second binder resin particle at 25° C. is 60% or less.

10 Claims, 1 Drawing Sheet

(51) Int. Cl.

| | |
|---|---|
| ***B41J 2/21*** | (2006.01) |
| ***C09D 11/102*** | (2014.01) |
| ***C09D 11/322*** | (2014.01) |
| ***C09D 11/38*** | (2014.01) |
| ***C09D 11/54*** | (2014.01) |

(52) U.S. Cl.
CPC .......... *C09D 11/102* (2013.01); *C09D 11/322* (2013.01); *C09D 11/38* (2013.01); *C09D 11/54* (2013.01)

(58) Field of Classification Search
CPC ....... C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2020/0023648 | A1 * | 1/2020 | Gotou | B41J 2/2117 |
| 2022/0017765 | A1 * | 1/2022 | Katayama | C09D 11/322 |
| 2023/0347380 | A1 * | 11/2023 | Koerner | B05D 3/08 |
| 2024/0228810 | A1 * | 7/2024 | Funakoshi | C09D 11/322 |
| 2024/0287340 | A1 * | 8/2024 | Koyama | B41J 2/2114 |
| 2025/0002742 | A1 * | 1/2025 | Takaori | B41J 11/007 |

* cited by examiner

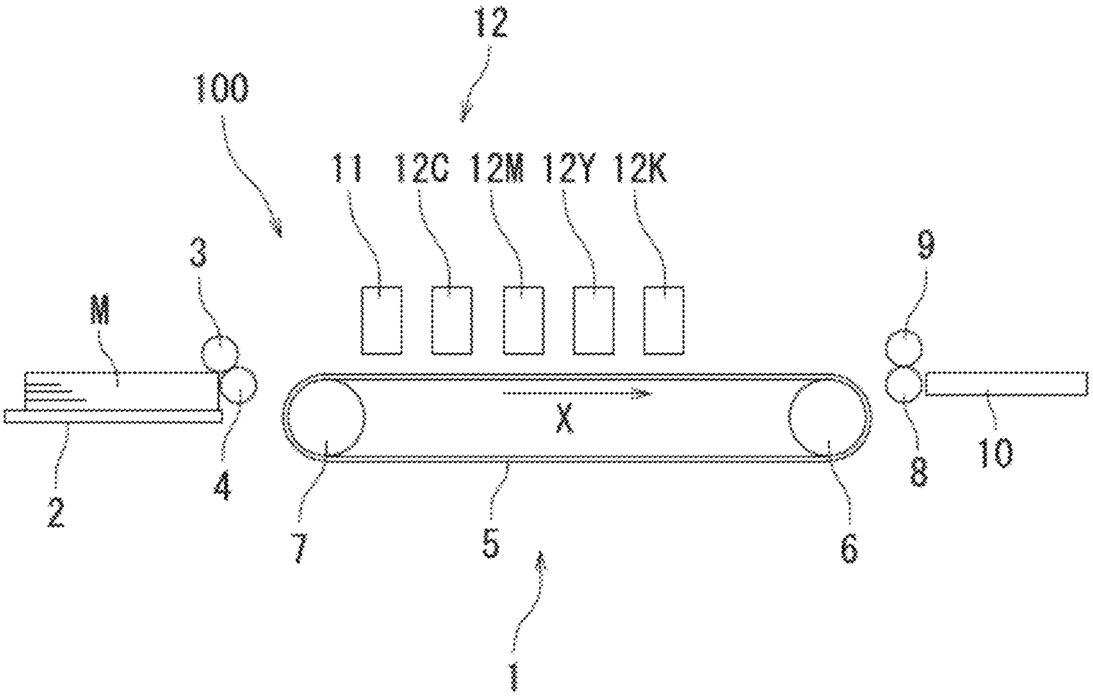
12
100
11
12C
12M
12Y
12K
3
M
9
X
2
4
7
5
6
8
10
1

INKJET INK SET, INKJET RECORDING APPARATUS, AND INKJET RECORDING METHOD

FIELD OF THE DISCLOSURE

The present disclosure relates to an inkjet ink set, an inkjet recording apparatus, and an inkjet recording method.

BACKGROUND OF THE DISCLOSURE

In inkjet printing on flexible packaging (resin film or the like), the recording medium is generally transparent. In the case where printing is performed on such a transparent recording medium using a normal inkjet ink, the formed image has insufficient concealing rate and the printed portion is difficult to see in some cases. For this reason, in the inkjet printing on flexible packaging, an inkjet ink set including a white ink and a color ink is used in some cases. In inkjet printing using this inkjet ink set, first, the white ink is ejected on a recording medium to form a base and then, the color ink is ejected on the base to form a desired image. In the above-mentioned inkjet printing, a sufficient concealing rate can be ensured by forming a base first. Such an inkjet ink set is desired to have excellent ejection stability of each ink and to be capable of imparting sufficient rubfastness and adhesion to a recording medium to a formed image.

In order to impart rubfastness and adhesion to a recording medium to an image to be formed by an inkjet ink set, a method of adding a binder resin particle to each ink is effective. As an inkjet ink including a binder resin particle, for example, an inkjet ink including a pigment, fine particles of a polyester resin, and a water-soluble epoxy compound has been proposed (Japanese Patent Application Laid-open No. 2003-313468).

SUMMARY OF THE DISCLOSURE

However, an inkjet ink including a binder resin particle tends to have insufficient ejection stability. For such a reason, it is difficult for even an inkjet ink set using the inkjet ink disclosed in Japanese Patent Application Laid-open No. 2003-313468 to satisfy all of ejection stability of each ink and rubfastness and adhesion to a recording medium of a formed image.

In view of the circumstances as described above, it is desirable to provide an inkjet ink set that has excellent ejection stability of each ink and is capable of forming an image having excellent rubfastness and adhesion to a recording medium, and an inkjet recording apparatus and an inkjet recording method using the same.

Solution to Problem

According to an embodiment of the present invention, there is provided an inkjet ink set, including: a first ink; and a second ink. The first ink includes a first pigment, a first binder resin particle, and a first aqueous medium. The second ink includes a second pigment, a second binder resin particle, and a second aqueous medium. The first binder resin particle includes a polyolefin resin. A breaking elongation of the first binder resin particle at 25° C. is greater than 60% and 750% or less. The second binder resin particle includes a urethane resin. A breaking elongation of the second binder resin particle at 25° C. is 60% or less.

According to an embodiment of the present invention, there is provided an inkjet recording apparatus, including:

the above inkjet ink set; a first recording head that ejects the first ink to a recording medium; and a second recording head that ejects the second ink to at least part of a region of the recording medium to which the first ink has been ejected. The recording medium is a non-absorbent recording medium.

According to an embodiment of the present invention, there is provided an inkjet recording method, including: a first step of ejecting the first ink to a recording medium using the above inkjet ink set; and a second step of ejecting the second ink to at least part of a region of the recording medium to which the first ink has been ejected. The recording medium is a non-absorbent recording medium.

The inkjet ink set, inkjet recording apparatus, and inkjet recording method according to embodiments of the present disclosure have excellent ejection stability of each ink and are capable of forming an image having excellent rubfastness and adhesion to a recording medium.

These and other objects, features and advantages of the present disclosure will become more apparent in light of the following detailed description of best mode embodiments thereof, as illustrated in the accompanying drawings.

BRIEF DESCRIPTION OF THE DRAWINGS

FIG. 1 is a diagram showing a main part of an inkjet recording apparatus 100 that is an example of the inkjet recording apparatus according to the embodiment of the present disclosure.

DETAILED DESCRIPTION OF THE EXEMPLARY EMBODIMENTS

Embodiments of the present disclosure will be described below. Note that in the present specification, unless otherwise noted, the number average primary particle size is a number average value of equivalent circle diameters (Heywood diameter: diameter of a circle having the same area as the projected area of a primary particle) of 100 primary particles measured using a scanning electron microscope (e.g., "JSM-7401F" manufactured by JEOL Ltd.) and image analysis software (e.g., "WinROOF" manufactured by MITANI CORPORATION).

The breaking elongation is a value measured by a tensile test using a tensile tester conforming to "Japanese Industrial Standard (JIS) K7127-1999" at 25° C.

Unless otherwise specified, the measured value of the glass transition temperature (Tg) is a value measured using a differential scanning calorimeter (e.g., "DSC-60" manufactured by SHIMADZU CORPORATION) in accordance with "Japanese Industrial Standard (JIS) K7121-2012". In the endothermic curve (vertical axis: heat flow (DSC signal), horizontal axis: temperature, heating rate of 5° C./min) measured by a differential scanning calorimeter, the temperature at the inflection point due to glass transition (in detail, the temperature at the intersection of the extrapolated line of the baseline and the extrapolated line of the falling line) corresponds to Tg (glass transition temperature).

In the present specification, acrylic and methacrylic are collectively referred to as "(meth)acrylic" in some cases. The components described in the present specification may each be used alone, or two or more of them may be used in combination.

<Inkjet Ink Set>

An inkjet ink set according to an embodiment of the present disclosure (hereinafter, referred to simply as an ink set in some cases) includes: a first ink; and a second ink. The first ink includes a first pigment, a first binder resin particle, and a first aqueous medium. The second ink includes a second pigment, a second binder resin particle, and a second aqueous medium. The first binder resin particle includes a polyolefin resin. A breaking elongation of the first binder resin particle at 25° C. is greater than 60% and 750% or less. The second binder resin particle includes a urethane resin. A breaking elongation of the second binder resin particle at 25° C. is 60% or less.

In the ink set according to the embodiment of the present disclosure, the first ink is favorably an ink for a base (ink for forming a base on the surface of a recording medium). For example, the second ink is favorably an ink for ejection on a base (ink for forming a desired image on a base).

In the ink set according to the embodiment of the present disclosure, the first ink is favorably a white ink. The second ink is favorably a color ink (ink other than the white ink). However, depending on the application, the first ink may be a color ink and the second ink may be a white ink.

The ink set according to the embodiment of the present disclosure may include two or more types of first inks and two or more types of second inks. The ink set according to the embodiment of the present disclosure favorably includes one type of first ink, two or more types of second inks (e.g., four types of second inks including a cyan ink, a magenta ink, a yellow ink, and a black ink).

The ink set according to the embodiment of the present disclosure is suitable for forming an image on a non-absorbent recording medium (particularly, flexible packaging). The non-absorbent recording medium has less ink absorption than the absorbent recording medium (e.g., plain paper). In the non-absorbent recording medium, the absorption amount of the aqueous medium is, for example, 1.0 $g/m^2$ or less. Examples of the non-absorbent recording medium include a recording medium formed of a resin, a recording medium formed of a metal, and a recording medium formed of glass. Examples of the recording medium formed of a resin include a resin sheet and a resin film. The resin included in the recording medium formed of a resin is favorably a thermoplastic resin. Specific examples of the resin include polyethylene, polypropylene, polyvinyl chloride, and polyethylene terephthalate (PET). Examples of the recording medium formed of a resin include an OPP film (biaxially stretched polypropylene film) and a PET film. In the case where an image is formed on the recording medium formed of a resin using the ink set according to the embodiment of the present disclosure, the surface (print surface) of the recording medium may be subjected to corona discharge treatment.

The ink set according to the embodiment of the present disclosure is used for surface printing. Here, the surface printing refers to printing on the surface of a recording medium on the front side (surface on the side viewed by a viewer) in printing on a transparent recording medium. In the case where the viewer views the recording medium on which surface printing has been performed, a positional relationship "viewer, image, and recording medium" is obtained, and the image is directly viewed by the viewer.

Note that in printing on a transparent recording medium, printing on the surface of the recording medium on the back side (surface on the side opposite to the side viewed by a viewer) refers to back printing. In the case where the views the recording medium on which back printing has been performed, a positional relationship "viewer, recording medium, and image" is obtained, and the image is viewed by the viewer through the recording medium.

By having the above-mentioned configuration, the ink set according to the embodiment of the present disclosure has excellent ejection stability of each ink and is capable of forming an image having excellent rubfastness and adhesion to a recording medium. The reason why the ink set according to the embodiment of the present disclosure achieves the above-mentioned effects is presumed to be as follows. The first ink includes a first binder resin particle. The first binder resin particle includes a polyolefin resin that is a resin having a high affinity with a non-absorbent recording medium. Further, the first binder resin particle has a relatively high breaking elongation and has a property of being easy to stretch. By including such a first binder resin particle, the first ink is capable of forming a base having excellent adhesion to a recording medium. Further, the second ink includes a second binder resin particle. A urethane resin included in the second binder resin particle has a relatively low breaking elongation and excellent strength. By including such a second binder resin particle, the second ink is capable of forming an image having excellent strength on the base. As a result, the ink set according to the embodiment of the present disclosure is capable of forming an image having excellent rubfastness and adhesion to a recording medium. Further, a binder resin particle that includes a urethane resin and has a relatively high breaking elongation (e.g., greater than 60%) is likely to cause clogging of the nozzle by the ink. On the other hand, in the ink set according to the embodiment of the present disclosure, the first binder resin particle included in the first ink includes a polyolefin resin. Further, the second binder resin particle included in the second ink has a breaking elongation of 60% or less. For this reason, the first binder resin particle and the second binder resin particle do not cause clogging of the nozzle by the first ink and the second ink, respectively. As a result, the ink set according to the embodiment of the present disclosure has excellent ejection stability of each ink. Details of the ink set according to the embodiment of the present disclosure will be further described below.

[First Ink]

The first ink includes a first pigment, a first binder resin particle, and a first aqueous medium. The first ink favorably further includes a pigment coating resin or a surfactant.

(First Pigment)

In the first ink, the first pigment forms a first pigment particle together with, for example, a pigment coating resin. The first pigment particle includes, for example, a first core including a pigment and a pigment coating resin covering the core. The first pigment particle is present in, for example, a state of being dispersed in the first aqueous medium.

As described above, the first ink is favorably a white ink. In this case, the first pigment is a white pigment. Meanwhile, the first ink may be a color ink. In this case, the first pigment is a color pigment.

Examples of the white pigment include zinc flower, titanium oxide, antimony white, zinc sulfide, a barite powder, barium carbonate, clay, silica, white carbon, talc, calcium carbonate, mica, kaolin, and alumina white. As the white pigment, titanium oxide is favorable.

Examples of the color pigment include a yellow pigment, an orange pigment, a red pigment, a blue pigment, a purple pigment, and a black pigment. Examples of the yellow pigment include C.I. Pigment Yellow (74, 93, 95, 109, 110, 120, 128, 138, 139, 151, 154, 155, 173, 180, 185, and 193). Examples of the orange pigment include C.I. Pigment Orange (34, 36, 43, 61, 63, and 71). Examples of the red pigment include C.I. Pigment Red (122 and 202). Examples of the blue pigment include C.I. Pigment Blue (15, more specifically 15:3). Examples of the purple pigment include C.I. Pigment Violet (19, 23, and 33). Examples of the black pigment include C.I. Pigment Black (7).

The number average primary particle size of the first pigment particle is favorably 10 nm or more and 300 nm or less, more favorably 40 nm or more and 120 nm or less. When the number average primary particle size of the first pigment particle is 10 nm or more, the ink set according to the embodiment of the present disclosure is capable of easily imparting desired image density to a formed image. When the number average primary particle size of the first pigment particle is 300 nm or less, it is possible to impart excellent preservation stability to the first ink.

The content ratio of the first pigment in the first ink is favorably 1.0 mass % or more and 10.0 mass % or less, more favorably 3.0 mass % or more and 5.0 mass % or less. When the content ratio of the first pigment in the first ink is 1.0 mass % or more, it is possible to impart a good concealing rate to an image to be formed by the first ink. When the content ratio of the first pigment in the first ink is 10.0 mass % or less, it is possible to impart excellent preservation stability to the first ink.

(Pigment Dispersion Resin)

A pigment dispersion resin adheres to the surface of the first pigment to optimize the dispersion stability of the first pigment in the first aqueous medium. Note that part of the pigment dispersion resin may be free in the first aqueous medium without adhering to the surface of the first pigment. Examples of the pigment dispersion resin include a polyether resin, a (meth)acrylic resin, a styrene-(meth) acrylic resin, and a styrene-maleic acid resin.

In the first ink, the content ratio of the pigment dispersion resin is favorably 0.1 mass % or more and 5.0 mass % or less, more favorably 0.5 mass % or more and 2.0 mass % or less. When the content ratio of the pigment dispersion resin is 0.1 mass % or more, it is possible to further optimize the dispersion stability of the first pigment in the first aqueous medium. When the content ratio of the pigment dispersion resin is 5.0 mass % or less, it is possible to further optimize the ejection stability of the first ink.

In the first ink, the ratio of the mass of the pigment dispersion resin to the mass of the first pigment is favorably 0.10 or more and 0.50 or less, more favorably 0.20 or more and 0.30 or less. When the ratio of the mass of the pigment dispersion resin to the mass of the first pigment is 0.10 or more and 0.50 or less, it is possible to further optimize the dispersion stability of the first pigment in the first aqueous medium.

[First Binder Resin Particle]

The first binder resin particle is present in the state of being dispersed in the first aqueous medium. The first binder resin particle functions as a binder in an image to be formed by the first ink and optimizes the fixation of the first pigment to the recording medium. The first binder resin particle includes a polyolefin resin. In the first binder resin particle, the content ratio of the polyolefin resin is favorably 90 mass % or more, more favorably 99 mass % or more, and still more favorably 100 mass %.

The polyolefin resin is a polymer of a raw material monomer containing olefin (e.g., ethylene, propylene, and butylene) as the main component. The above-mentioned raw material monomer may include another monomer (e.g., a vinyl compound such as styrene). Examples of the polyolefin resin include polyethylene, polypropylene, and polybutylene.

The glass transition temperature of the polyolefin resin is favorably 80° C. or more and 130° C. or less, more favorably 95° C. or more and 110° C. or less, and still more favorably 103° C. or more and 107° C. or less. When the glass transition temperature of the polyolefin resin is 80° C. or more, it is possible to further optimize the ejection stability of the first ink. When the glass transition temperature of the polyolefin resin is 130° C. or less, it is possible to further optimize the adhesion of an image to be formed by the ink set according to the embodiment of the present disclosure.

The breaking elongation of the first binder resin particle at 25° C. is greater than 60% and 750% or less, favorably 300% or more and 750% or less, more favorably 500% or more and 720% or less, and still more favorably 650% or more and 720% or less. When the breaking elongation of the first binder resin particle at 25° C. is greater than 60%, it is possible to optimize the adhesion of an image to be formed by the ink set according to the embodiment of the present disclosure to the recording medium. When the breaking elongation of the first binder resin particle at 25° C. is 750% or less, it is possible to optimize the rubfastness and adhesion to the recording medium of an image to be formed by the ink set according to the embodiment of the present disclosure.

The number average primary particle size of the first binder resin particle is favorably 10 nm or more and 100 nm or less, more favorably 20 nm or more and 40 nm or less. When the number average primary particle size of the first binder resin particle is 10 nm or more and 100 nm or less, it is possible to optimize the dispersion stability of the first binder resin particle in the first ink.

In the first ink, the content ratio of the first binder resin particle is favorably 1.0 mass % or more and 8.0 mass % or less, more favorably 2.0 mass % or more and 4.0 mass % or less. When the content ratio of the first binder resin particle is 1.0 mass % or more, it is possible to further optimize the rubfastness and adhesion to the recording medium of an image to be formed by the ink set according to the embodiment of the present disclosure. When the content ratio of the first binder resin particle is 8.0 mass % or less, it is possible to further optimize the ejection stability of the first ink.

[First Aqueous Medium]

The first aqueous medium is a medium including water. The first aqueous medium may function as a solvent or a dispersion medium. Specific examples of the first aqueous medium include an aqueous medium including water and a water-soluble organic solvent.

(Water)

In the first ink, the content ratio of water is favorably 25.0 mass % or more and 80.0 mass % or less, more favorably 55.0 mass % or more and 65.0 mass % or less.

Examples of the water-soluble organic solvent include a glycol compound, a glycolether compound, a lactam compound, a nitrogen-containing compound, an acetate compound, thiodiglycol, glycerin, and dimethylsulfoxide.

Examples of the glycol compound include ethylene glycol, 1,3-propanediol, propylene glycol, 1,2-pentanediol, 1,5-pentanediol, 1,2-octanediol, 1,8-octanediol, 3-methyl-1,3-butanediol, 3-methyl-1,5-pentanediol, diethylene glycol, triethylene glycol, and tetraethylene glycol. As the glycol compound, propylene glycol is favorable.

Examples of the glycolether compound include diethylene glycol diethylether (diethyl diglycol), diethylene glycol monobutylether, ethylene glycol monomethylether, ethylene glycol monobutylether, diethylene glycol monomethylether, diethylene glycol monoethylether, diethylene glycol diethylether, triethylene glycol monomethylether, triethylene glycol monoethylether, triethylene glycol monobutylether, and propylene glycol monomethylether. As the glycolether compound, triethylene glycol monobutylether is favorable.

Examples of the lactam compound include 2-pyrrolidone and N-methyl-2-pyrrolidone.

Examples of the nitrogen-containing compound include 1,3-dimethylimidazolidinone, formamide, and dimethylformamide.

Examples of the acetate compound include diethylene glycol monoethylether acetate.

As the water-soluble organic solvent, a glycol compound or a glycolether compound is favorable, propylene glycol or triethylene glycol monobutylether is more favorable.

The content ratio of the water-soluble organic solvent in the first ink is favorably 10.0 mass % or more and 50.0 mass % or less, more favorably 25.0 mass % or more and 35.0 mass % or less.

The content ratio of the glycol compound in the first ink is favorably 8.0 mass % or more and 40.0 mass % or less, more favorably 15.0 mass % or more and 25.0 mass % or less.

The content ratio of the glycolether compound in the first ink is favorably 2.0 mass % or more and 15.0 mass % or less, more favorably 6.0 mass % or more and 10.0 mass % or less.

The first aqueous medium favorably includes only water, propylene glycol, and triethylene glycol monobutylether. The total content ratio of water, propylene glycol, and triethylene glycol monobutylether in the first aqueous medium is favorably 90 mass % or more, more favorably 99 mass % or more, and still more favorably 100 mass %.

(Surfactant)

The surfactant optimizes the compatibility and dispersion stability of each component included in the first ink. Further, the surfactant imparts the wettability of the first ink to the recording medium. As the surfactant in the first ink, a nonionic surfactant is favorable.

Examples of the nonionic surfactant in the first ink include an acetylene glycol surfactant (surfactant including an acetylene glycol compound), a silicone surfactant (surfactant including a silicone compound), and a fluorosurfactant (surfactant including a fluoropolymer or a fluorine-containing compound). Examples of the acetylene glycol surfactant include an ethylene oxide adduct of acetylene glycol and a propylene oxide adduct of acetylene glycol. The first ink favorably includes a silicone surfactant.

The content ratio of the surfactant in the first ink is 0.1 mass % or more and 2.0 mass % or less, more favorably 0.2 mass % or more and 0.5 mass % or less.

[Different Component]

The first ink may further include, as necessary, known additives (more specifically, for example, a dissolution stabilizer, an anti-drying agent, an antioxidant, a viscosity adjustor, a pH adjuster, and an antifungal agent).

[First Method of Producing Ink]

The first ink can be produced by, for example, mixing a first pigment dispersion liquid including a first pigment, a first binder resin particle dispersion liquid including a first binder resin particle, a first aqueous medium, and a different component (e.g., a surfactant) to be added as necessary. In the production of the first ink, after uniformly mixing each component, foreign substances and coarse particles may be removed by a filter (e.g., a filter having a pore size of 5 μm or less).

[Second Ink]

The second ink includes a second pigment, a second binder resin particle, and a second aqueous medium. The second ink favorably further includes a pigment coating resin or a surfactant.

(Second Pigment)

In the second ink, the second pigment forms a second pigment particle together with, for example, a pigment coating resin. The second pigment particle includes, for example, a core including a second pigment and a pigment coating resin covering the core. The second pigment particle is present in, for example, a state of being dispersed in the second aqueous medium.

As described above, the second ink is favorably a color ink. In this case, the second pigment is a color pigment. Meanwhile, the second ink may be a white ink. In this case, the second pigment is a white pigment. Examples of the white pigment and the color pigment used in the second ink can be the same as the examples of the white pigment and the color pigment used in the first ink.

The number average primary particle size of the second pigment particle is favorably 10 nm or more and 300 nm or less, more favorably 40 nm or more and 120 nm or less. When the number average primary particle size of the second pigment particle is 10 nm or more, the ink set according to the embodiment of the present disclosure is capable of easily imparting desired image density to a formed image. When the number average primary particle size of the second pigment particle is 300 nm or less, it is possible to impart excellent preservation stability to the second ink.

The content ratio of the second pigment in the second ink is favorably 1.0 mass % or more and 10.0 mass % or less, more favorably 3.0 mass % or more and 5.0 mass % or less. When the content ratio of the second pigment in the second ink is 1.0 mass % or more, it is possible to impart desired image density to an image to be formed by the ink set according to the embodiment of the present disclosure. When the content ratio of the second pigment in the second ink is 10.0 mass % or less, it is possible to impart excellent preservation stability to the second ink.

(Pigment Dispersion Resin)

The pigment dispersion resin adheres to the surface of the second pigment to optimize the dispersion stability of the second pigment in the second aqueous medium. Note that part of the pigment dispersion resin may be free in the second aqueous medium without adhering to the surface of the second pigment. Examples of the pigment dispersion resin include a polyether resin, a (meth)acrylic resin, a styrene-(meth)acrylic resin, and a styrene-maleic acid resin.

In the second ink, the content ratio of the pigment dispersion resin is favorably 0.1 mass % or more and 5.0 mass % or less, more favorably 0.5 mass % or more and 2.0 mass % or less. When the content ratio of the pigment dispersion resin is 0.1 mass % or more, it is possible to further optimize the dispersion stability of the second pigment in the second aqueous medium. When the content ratio of the pigment dispersion resin is 5.0 mass % or less, it is possible to further optimize the ejection stability of the second ink.

[Second Binder Resin Particle]

The second binder resin particle is present in a state of being dispersed in the second aqueous medium. The second binder resin particle functions as a binder in an image to be formed by the second ink and optimizes the fixation of the second pigment to the base. Further, the second binder resin particle imparts rubfastness to an image to be formed by the second ink. The second binder resin particle includes a urethane resin. In the second binder resin particle, the content ratio of the urethane resin is favorably 90 mass % or more, more favorably 99 mass % or more, and still more favorably 100 mass %.

The urethane resin is not particularly limited and only needs to be a rein having a urethane bond in its molecule. The urethane resin is, for example, a copolymer of a diol compound or a bisphenol compound and a polyisocyanate.

Examples of commercial products of the second binder resin particle dispersion liquid of the second binder resin particle include "SUPERFLEX (registered trademark) 170", "SUPERFLEX (registered trademark) 210", "SUPERFLEX (registered trademark) 820", and "SUPERFLEX (registered trademark) 870", which are manufactured by DKS Co. Ltd., "TAKELAC (registered trademark) W-6010", and "TAKELAC (registered trademark) W-6020", which are manufactured by Mitsui Chemicals, Inc.

The glass transition temperature of the urethane resin is favorably 60° C. or more and 90° C. or less, more favorably 70° C. or more and 85° C. or less, and still more favorably 77° C. or more and 80° C. or less. When the glass transition temperature of the urethane resin is 60° C. or more, it is possible to further optimize the ejection stability of the second ink. When the glass transition temperature of the urethane resin is 130° C. or less, it is possible to further optimize the adhesion of an image to be formed by the ink set according to the embodiment of the present disclosure.

The breaking elongation of the second binder resin particle at 25° C. is 60% or less, favorably 3% or more and 60% or less, and still more favorably 3% or more and 10% or less. When the breaking elongation of the second binder resin particle at 25° C. is 60% or less, it is possible to impart sufficient strength to an image to be formed by the second ink. As a result, it is possible to optimize the rubfastness and adhesion to the recording medium of an image to be formed by the ink set according to the embodiment of the present disclosure.

The number average primary particle size of the second binder resin particle is favorably 10 nm or more and 100 nm or less, more favorably 15 nm or more and 50 nm or less. When the number average primary particle size of the second binder resin particle is 10 nm or more and 100 nm or less, it is possible to optimize the dispersion stability of the second binder resin particle in the second ink.

In the second ink, the content ratio of the second binder resin particle is favorably 1.0 mass % or more and 8.0 mass % or less, more favorably 2.0 mass % or more and 4.0 mass % or less. When the content ratio of the second binder resin particle is 1.0 mass % or more, it is possible to further optimize the rubfastness and adhesion to the recording medium of an image to be formed by the ink set according to the embodiment of the present disclosure. When the content ratio of the second binder resin particle is 8.0 mass % or less, it is possible to further optimize the ejection stability of the second ink.

[Second Aqueous Medium]

The second aqueous medium is a medium including water. The second aqueous medium may function as a solvent or a dispersion medium. Examples of the type and content ratio of component included in the second aqueous medium can be the same as the type and content ratio of component included in the first aqueous medium. The first aqueous medium and the second aqueous medium are favorably the same composition.

(Surfactant)

The surfactant optimizes the compatibility and dispersion stability of each component included in the second ink. Examples of the type and content ratio of surfactant in the second ink can be the same as the type and content ratio of surfactant included in the first ink. The first aqueous medium and the second aqueous medium favorably include the same surfactant in the same content ratio. That is, each of the first aqueous medium and the second aqueous medium favorably includes a silicone surfactant.

[Different Component]

The second ink may further include, as necessary, known additives (more specifically, for example, a dissolution stabilizer, an anti-drying agent, an antioxidant, a viscosity adjustor, a pH adjuster, and an antifungal agent).

[Method of Producing Second Ink]

The second ink can be produced by, for example, mixing a second pigment dispersion liquid including a second pigment, a second binder resin particle dispersion liquid including a second binder resin particle, a second aqueous medium, and a different component (e.g., a surfactant) to be added as necessary. In the production of the second ink, after uniformly mixing each component, foreign substances and coarse particles may be removed by a filter (e.g., a filter having a pore size of 5 μm or less).

Second Embodiment: Inkjet Recording Apparatus

An inkjet recording apparatus according to a second embodiment of the present disclosure includes the ink set according to the first embodiment, a first recording head that ejects the first ink to a recording medium, and a second recording head that ejects the second ink to at least part of a region of the recording medium to which the first ink has been ejected. The recording medium is a non-absorbent recording medium.

Since the inkjet recording apparatus according to the embodiment of the present disclosure uses the ink set according to the first embodiment, it has excellent ejection stability of each ink and is capable of forming an image having excellent rubfastness and adhesion to a recording medium.

The inkjet recording apparatus according to the embodiment of the present disclosure will be described below with reference to the drawings. Note that the drawings to be referred to schematically show mainly respective components for ease of understanding, and the size, number, and the like of each illustrated component are different from actual ones in some cases for the convenience of drawing creation.

FIG. 1 is a diagram showing a main part of an inkjet recording apparatus 100 that is an example of the inkjet recording apparatus according to the embodiment of the present disclosure. As shown in FIG. 1, the inkjet recording apparatus 100 mainly includes a conveying unit 1 and a line head. The line head includes a white ink recording head 11 (first recording head) and a color ink recording head 12 (second recording head). The inkjet recording apparatus 100 further includes a paper feed tray 2, a paper feed roller 3, a paper feed driven roller 4, a conveyor belt 5, a belt drive roller 6, a belt driven roller 7, an output roller 8, an output driven roller 9, and a paper output tray 10. The conveyor belt 5, the belt drive roller 6, and the belt driven roller 7 constitute part of the conveying unit 1. The paper feed tray 2 is provided on the left end portion of the inkjet recording apparatus 100 in FIG. 1. The paper feed tray 2 houses a non-absorbent recording medium M. The paper feed roller 3 and the paper feed driven roller 4 are provided on one end portion of the paper feed tray 2. The paper feed roller 3 takes out the housed non-absorbent recording medium M from the topmost non-absorbent recording medium M one sheet at a time and conveys and feeds it to the conveyor belt 5. The paper feed driven roller 4 is pressed against the paper feed roller 3 to be driven to rotate.

The conveyor belt 5 is rotatably disposed on the downstream side (right side in FIG. 1) in the conveying direction of the paper feed roller 3 and the paper feed driven roller 4. The conveyor belt 5 is stretched over the belt drive roller 6 and the belt driven roller 7. The belt drive roller 6 is disposed on the downstream side in the conveying direction. The belt drive roller 6 drives the conveyor belt 5. The belt driven roller 7 is disposed on the upstream side in the conveying direction. The belt driven roller 7 rotates in accordance with the belt drive roller 6 via the conveyor belt 5. When the belt drive roller 6 is driven to rotate in the clockwise direction to convey the non-absorbent recording medium M in a conveying direction X indicated by an arrow.

Further, the output roller 8 and the output driven roller 9 are provided on the downstream side in the conveying direction of the conveyor belt 5. The output roller 8 is driven clockwise in FIG. 1 and outputs the non-absorbent recording medium M on which an image has been formed to the outside of the apparatus casing. The output driven roller 9 is pressed against the upper part of the output roller 8 to be driven to rotate. The paper output tray 10 is provided on the downstream side of the output roller 8 and the output driven roller 9. The non-absorbent recording medium M output to the outside of the apparatus casing is placed on the paper output tray 10.

The white ink recording head 11 is disposed above the conveyor belt 5. The white ink recording head 11 ejects the white ink to an image formation region of the non-absorbent recording medium M conveyed on the conveyor belt 5. In this way, the white ink recording head 11 forms a base on the image formation region of the non-absorbent recording medium M.

The color ink recording head 12 is disposed downstream of the white ink recording head 11 in the conveying direction. The color ink recording head 12 includes a cyan ink recording head 12C, a magenta ink recording head 12M, a yellow ink recording head 12Y, and a black ink recording head 12K. The cyan ink recording head 12C, the magenta ink recording head 12M, the yellow ink recording head 12Y, and the black ink recording head 12K are disposed in this order above the conveyor belt 5 from the upstream side to the downstream side in the conveying direction of the non-absorbent recording medium M. The cyan ink recording head 12C to the black ink recording head 12K are supported at a height at which the distance from the upper surface of the conveyor belt 5 is a predetermined length. The cyan ink recording head 12C to the black ink recording head 12K form an image on the base of the non-absorbent recording medium M conveyed on the conveyor belt 5. Color inks of four different colors (cyan, magenta, yellow, and black) are respectively housed in the cyan ink recording head 12C to the black ink recording head 12K. By ejecting the color ink from each of the cyan ink recording head 12C to the black ink recording head 12K, a color image is formed on the base of the non-absorbent recording medium M.

Although an example of the inkjet recording apparatus according to the embodiment of the present disclosure has been described above, the inkjet recording apparatus according to the embodiment of the present disclosure is not limited to that shown in FIG. 1.

In FIG. 1, the inkjet recording apparatus 100 including four color ink recording heads 12 corresponding to inks of four colors has been described as an example. However, the number of recording heads included in the inkjet recording apparatus according to the embodiment of the present disclosure is not limited as long as it is 2 or more, and can be, for example, 2 or more and 10 or less, favorably 3 or more and 5 or less.

Further, although the inkjet recording apparatus 100 ejects inks of four colors, i.e., cyan, magenta, yellow, and black, in this order, the type, combination, and ejection order of inks are not limited thereto.

The inkjet recording apparatus according to the embodiment of the present disclosure may be a multifunction device that further has a function of a scanner, a copier, a printer, or a facsimile machine.

Third Embodiment: Inkjet Recording Method

An inkjet recording method according to a third embodiment of the present disclosure includes a first step of ejecting the first ink to a recording medium using the ink set according to the first embodiment, and a second step of ejecting the second ink to at least part of a region of the recording medium to which the first ink has been ejected. The recording medium is a non-absorbent recording medium.

The inkjet recording method according to the embodiment of the present disclosure uses the ink set according to the first embodiment, it has excellent ejection stability of each ink and is capable of forming an image having excellent rubfastness and adhesion to a recording medium. The inkjet recording method according to the embodiment of the present disclosure can be carried out by, for example, using the inkjet recording apparatus according to the second embodiment.

[First Step]

In this step, the first ink is ejected to a recording medium. In this way, an image is formed on an image formation region of the recording medium.

[Second Step]

In this step, the second ink is ejected to at least part of a region of the recording medium (e.g., a base) to which the first ink has been ejected. In this way, a desired image is formed on the recording medium. The inkjet recording method according to the embodiment of the present disclosure may further include a heating step of heating the recording medium after this step in order to improve fixation of the first ink and the second ink.

EXAMPLES

Examples of the present disclosure will be described below. However, the present disclosure is not limited to the following Examples.

[Preparation of White Pigment Dispersion Liquid]

100.0 parts by mass of a white pigment, 62.5 parts by mass of a pigment coating resin-containing solution (content of a pigment dispersion resin: 25.0 parts by mass), 10.0 parts by mass of 2-propanol, and 27.5 parts by mass of water were mixed using a dispersion device to obtain a mixture. As the white pigment, a titanium oxide particle ("JR-804" manufactured by TAYCA Co., Ltd.) was sed. As the pigment coating resin, "DISPERBYK-190" manufactured by BYK Japan KK (solid content concentration: 40 mass %, dispersion medium: water) was used. Subsequently, the above-mentioned mixture was dispersed using a bead mill ("Dyno (registered trademark) mill" manufactured by WAB) filled with zirconia beads having a diameter of 0.3 mm to obtain a white pigment dispersion liquid (solid content concentration of 62.5 mass %).

[Preparation of Black Pigment Dispersion Liquid]

A black pigment dispersion liquid was prepared by the following method. The composition of the prepared black pigment dispersion liquid is shown below.

Water: 80 mass %

Resin A-Na: 5 mass %

Black pigment ("MONARCH (registered trademark) 800" manufactured by Cabot Corporation): 15 mass %

(Preparation of Resin A)

A resin A for obtaining a "resin A-Na" was prepared by the following method. In detail, a stirrer, a nitrogen introduction tube, a capacitor, and a dropping funnel were set in a four-necked flask. Next, 100 parts by mass of isopropyl alcohol and 300 parts by mass of methyl ethyl ketone were added to the flask. The content of the flask was heated at 70° C. to reflux while bubbling nitrogen therein.

Next, a solution L1 was prepared. In detail, 40.0 parts by mass of styrene, 10.0 parts by mass of methacrylic acid, 40.0 parts by mass of methyl methacrylate, 10.0 parts by mass of butyl acrylate, and 0.4 parts by mass of azobisisobutyronitrile (AIBN, a polymerization initiator) were mixed to obtain the solution L1 that is a monomer solution. While the content of the flask was heated at 70° C. to reflux, the solution L1 was added dropwise into the flask over 2 hours. After the dropping, the content of the flask was heated at 70° C. to reflux for another 6 hours.

Next, a solution L2 was prepared. In detail, 0.2 parts by mass of AIBN and 150.0 parts by mass of methyl ethyl ketone were mixed to obtain the solution L2. The solution L2 was added dropwise into the flask for 15 minutes. After the dropping, the content of the flask was heated at 70° C. to reflux for another 5 hours. In this way, the resin A (styrene-(meth)acrylic resin) was obtained. The obtained resin A had a mass average molecular weight (Mw) of 20000 and the acid value of 100 mgKOH/g.

Here, the mass average molecular weight Mw of the resin A was measured using gel permeation chromatography ("HLC-8020GPC" manufactured by TOSOH CORPORATION) under the following conditions.

Column: "TSKgel SuperMultiporeHZ-H" (semi-micro-column of 4.6 mm I.D.×15 cm) manufactured by TOSOH CORPORATION Number of columns: 3

Eluent: tetrahydrofuran

Flow rate: 0.35 mL/min

Sample injection amount: 10 μL

Measurement temperature: 40° C.

Detector: IR detector

Calibration curves were created selecting 7 types of F-40, F-20, F-4, F-1, A-5000, A-2500, and A-1000 and n-propylbenzene from TSKgel standard polystyrene manufactured by TOSOH CORPORATION.

Further, the acid value of the resin A was measured by a method conforming to "Japanese Industrial Standard (JIS) K0070-1992 (Test methods for acid value, saponification value, ester value, iodine value, hydroxyl value and unsaponifiable matter of chemical products)".

(Preparation of Black Pigment Dispersion Liquid)

An aqueous sodium hydroxide solution was added to the resin A by the amount necessary for neutralizing the resin A while heating the resin A in a warm bath at 70° C. More specifically, an aqueous sodium hydroxide solution of 1.1 times the neutralization equivalent mass was added to the resin A. In this way, an aqueous solution of the resin A (resin A-Na) neutralized with sodium hydroxide was obtained. The pH of the aqueous solution of the resin A-Na was 8.

The above-mentioned aqueous solution including 5 parts by mass of the resin A-Na, 15 parts by mass of C.I. Pigment Blue 15:3, and water were added to a vessel of a media disperser ("Dyno (registered trademark) mill" manufactured by Willy A Bachofen AG (WAB)) such that the above-mentioned blending amount was achieved, thereby making the total amount 100 parts by mass. Note that water was added such that the mass of water was 80 parts by mass, including the mass of water contained in the aqueous sodium hydroxide solution used for neutralizing the resin A and the mass of water generated by the neutralization reaction.

Next, the vessel was filled with media (zirconia beads having a diameter of 1.0 mm) such that the filling rate was 70% by volume to the volume of the vessel. The content of the vessel was dispersed using a media disperser. In this way, a black pigment dispersion liquid was obtained.

The black pigment dispersion liquid was 300-fold diluted with water to obtain a diluted solution. The diluted solution was measured using a dynamic light scattering particle size distribution analyzer ("Zetasizer Nano ZS" manufactured by Malvern Panalytical Ltd.) to obtain a volume median diameter ($D_{50}$) of pigment particles included in the black pigment dispersion liquid. The fact that pigment particles having a volume median diameter within the range of 70 nm or more and 130 nm or less were dispersed in the black pigment dispersion liquid was then confirmed.

[Binder Resin Particle Dispersion Liquid]

Polyolefin resin particle dispersion liquids A to B and urethane resin particle dispersion liquids A to G shown in the following Table 1 were prepared as binder resin particle dispersion liquids to be used for preparing a white ink and a black ink. In the following Table 1, the solid content concentration (described as "Concentration" in Table 1) of each binder resin particle, the number average primary particle size (described as "Diameter" in Table 1) of resin particles included in each binder resin particle dispersion liquid, the glass transition temperature (Tg), and the breaking elongation are shown together.

TABLE 1

| | Type | Manufacturer | Product name | Concentration [wt %] | Diameter [nm] | Breaking elongation [%] | Tg [° C.] |
|---|---|---|---|---|---|---|---|
| Polyolefin resin particle dispersion liquid | A | UNITIKA LTD. | SB-1010 | 24 | 30 | 700 | 105 |
| | B | UNITIKA LTD. | SB-1030N | 25 | 10 | 600 | 100 |
| Urethane resin particle dispersion liquid | A | DKS Co. Ltd. | SF-210 | 35 | 20 | 5 | 72 |
| | B | DKS Co. Ltd. | SF-150 | 30 | 30 | 330 | 40 |
| | C | DKS Co. Ltd. | SF-870 | 30 | 30 | 4 | 78 |
| | D | DKS Co. Ltd. | SF-170 | 33 | 10 | 50 | 75 |
| | E | DKS Co. Ltd. | SF-460 | 38 | 40 | 750 | −21 |

TABLE 1-continued

| Type | Manufacturer | Product name | Concentration [wt %] | Diameter [nm] | Breaking elongation [%] | Tg [° C.] |
|---|---|---|---|---|---|---|
| F | DKS Co. Ltd. | SF-126 | 30 | 20 | 87 | 72 |
| G | DKS Co. Ltd. | SF-420 | 32 | 10 | 290 | −10 |

Note that hereinafter, the resin particles included in the polyolefin resin particle dispersion liquids A to B will be respectively referred to as polyolefin resin particles A to B in some cases. Further, the resin particles included in the urethane resin particle dispersion liquids A to G will be respectively referred to as urethane resin particles A to G in some cases.

<Preparation of Ink Set>

Ink sets according to Examples 1 to 8 and Comparative Examples 1 to 8 were prepared by the following method.

Example 1

A white ink and a black ink prepared by the method shown below were combined to obtain the ink set according to Example 1.

(Preparation of White Ink)

8.0 parts by mass of a white pigment dispersion liquid (4.0 parts by mass of a white pigment, 1.0 part by mass of a pigment coating resin), a polyolefin resin particle dispersion liquid A (3.0 parts by mass of the polyolefin resin particle A), 20.0 parts by mass of propylene glycol, 8.0 parts by mass of triethylene glycol monobutylether (TEGMBE), 0.3 parts by mass of a silicone surfactant ("SILFACE (registered trademark) SAG 503A" manufactured by Nissin Chemical co., ltd.), and ion exchanged water were mixed to obtain a mixed solution (I). The amount of the polyolefin resin particle dispersion liquid A added was set to the amount that would make the amount of polyolefin resin particles included in the mixed solution (I) 3.0 parts by mass. The amount of ion exchanged water added was set to the amount that would make the total amount of the mixed solution (I) 100.0 parts by mass.

The above-mentioned mixture (I) was stirred using a stirrer ("Three-One MotorBL-600" manufactured by Shinto Scientific Co., Ltd.) at the rotation speed of 400 rpm. Next, the stirred mixed solution (I) was filtered with a filter having a pore size of 5 μm to remove foreign substances and coarse particles. As a result, a white ink having the composition shown in the following Table 2 was obtained. This white ink was used as a white ink (first ink) to be used in the ink set according to Example 1.

(Preparation of Black Ink)

8.0 parts by mass of a black pigment dispersion liquid (4.0 parts by mass of a black pigment, 1.0 part by mass of a pigment coating resin), a urethane resin particle dispersion liquid C (3.0 parts by mass of the urethane resin particle C), 20.0 parts by mass of propylene glycol, 8.0 parts by mass of triethylene glycol monobutylether (TEGMBE), 0.3 parts by mass of a silicone surfactant ("SILFACE (registered trademark) SAG 503A" manufactured by Nissin Chemical co., ltd.), and ion exchanged water were mixed to obtain a mixed solution (II). The amount of the urethane resin particle dispersion liquid C added was set to the amount that would make the amount of the urethane resin particle C included in the mixed solution (II) 3.0 parts by mass. The amount of ion exchanged water added was set to the amount that would make the total amount of the mixed solution (II) 100.0 parts by mass.

The above-mentioned mixture (II) was stirred using a stirrer ("Three-One Motor BL-600" manufactured by Shinto Scientific Co., Ltd.) at the rotation speed of 400 rpm. Next, the stirred mixed solution (II) was filtered with a filter having a pore size of 5 μm to remove foreign substances and coarse particles. As a result, a black ink having the composition shown in the following Table 2 was obtained. This black ink was used as a black ink (second ink) to be used in the ink set according to Example 1.

Examples 2 to 8 and Comparative Examples 1 to 8

Ink sets according to Examples 2 to 8 and Comparative Examples 1 to 8 were prepared in the same manner as in the preparation of the ink set according to Example 1 except that the following points were changed. In the preparation of the ink sets according to Examples 2 to 8 and Comparative Examples 1 to 8, the types and added amounts of polyolefin resin particle dispersion liquid and urethane resin particle dispersion liquid to be used in preparation of a white ink and preparation of a black ink were changed such that the composition of each ink was as shown in the following Tables 2 to 3. In the following Tables 2 to 3, the "parts" indicates parts by mass.

TABLE 2

| | | Example | | | | | | | |
|---|---|---|---|---|---|---|---|---|---|
| | | 1 | 2 | 3 | 4 | 5 | 6 | 7 | 8 |
| First | White pigment | 4.0 | 4.0 | 4.0 | 4.0 | 4.0 | 4.0 | 4.0 | 4.0 |
| ink | Pigment coating resin | 1.0 | 1.0 | 1.0 | 1.0 | 1.0 | 1.0 | 1.0 | 1.0 |
| [parts] | Polyolefin resin particle A | 3.0 | 3.0 | — | — | 2.0 | 7.0 | 3.0 | 3.0 |
| | Polyolefin resin particle B | — | — | 3.0 | 3.0 | — | — | — | — |
| | Urethane resin particle A | — | — | — | — | — | — | — | — |
| | Urethane resin particle B | — | — | — | — | — | — | — | — |
| | Propylene glycol | 20.0 | 20.0 | 20.0 | 20.0 | 20.0 | 20.0 | 20.0 | 20.0 |

TABLE 2-continued

| | | Example | | | | | | | |
|---|---|---|---|---|---|---|---|---|---|
| | | 1 | 2 | 3 | 4 | 5 | 6 | 7 | 8 |
| | TEGMBE | 8.0 | 8.0 | 8.0 | 8.0 | 8.0 | 8.0 | 8.0 | 8.0 |
| | Surfactant | 0.3 | 0.3 | 0.3 | 0.3 | 0.3 | 0.3 | 0.3 | 0.3 |
| | Ion exchanged water | Remainder | | | | | | | |
| | Total | 100.0 | | | | | | | |
| Second ink [parts] | Black pigment | 4.0 | 4.0 | 4.0 | 4.0 | 4.0 | 4.0 | 4.0 | 4.0 |
| | Pigment coating resin | 1.0 | 1.0 | 1.0 | 1.0 | 1.0 | 1.0 | 1.0 | 1.0 |
| | Urethane resin particle C | 3.0 | — | 3.0 | — | 3.0 | 3.0 | 2.0 | 7.0 |
| | Urethane resin particle D | — | 3.0 | — | 3.0 | — | — | — | — |
| | Urethane resin particle E | — | — | — | — | — | — | — | — |
| | Urethane resin particle F | — | — | — | — | — | — | — | — |
| | Urethane resin particle G | — | — | — | — | — | — | — | — |
| | Propylene glycol | 20.0 | 20.0 | 20.0 | 20.0 | 20.0 | 20.0 | 20.0 | 20.0 |
| | TEGMBE | 8.0 | 8.0 | 8.0 | 8.0 | 8.0 | 8.0 | 8.0 | 8.0 |
| | Surfactant | 0.3 | 0.3 | 0.3 | 0.3 | 0.3 | 0.3 | 0.3 | 0.3 |
| | Ion exchanged water | Remainder | | | | | | | |
| | Total | 100.0 | | | | | | | |

TABLE 3

<Evaluation>

| | | Comparative Example | | | | | | | |
|---|---|---|---|---|---|---|---|---|---|
| | | 1 | 2 | 3 | 4 | 5 | 6 | 7 | 8 |
| First ink [parts] | White pigment | 4.0 | 4.0 | 4.0 | 4.0 | 4.0 | 4.0 | 4.0 | 4.0 |
| | Pigment coating resin | 1.0 | 1.0 | 1.0 | 1.0 | 1.0 | 1.0 | 1.0 | 1.0 |
| | Polyolefin resin particle A | 3.0 | 3.0 | 3.0 | — | — | — | — | — |
| | Polyolefin resin particle B | — | — | — | — | — | — | — | — |
| | Urethane resin particle A | — | — | — | 3.0 | 3.0 | — | — | 3.0 |
| | Urethane resin particle B | — | — | — | — | — | 3.0 | 3.0 | — |
| | Propylene glycol | 20.0 | 20.0 | 20.0 | 20.0 | 20.0 | 20.0 | 20.0 | 20.0 |
| | TEGMBE | 8.0 | 8.0 | 8.0 | 8.0 | 8.0 | 8.0 | 8.0 | 8.0 |
| | Surfactant | 0.3 | 0.3 | 0.3 | 0.3 | 0.3 | 0.3 | 0.3 | 0.3 |
| | Ion exchanged water | Remainder | | | | | | | |
| | Total | 100.0 | | | | | | | |
| Second ink [parts] | Black pigment | 4.0 | 4.0 | 4.0 | 4.0 | 4.0 | 4.0 | 4.0 | 4.0 |
| | Pigment coating resin | 1.0 | 1.0 | 1.0 | 1.0 | 1.0 | 1.0 | 1.0 | 1.0 |
| | Urethane resin particle C | — | — | — | 3.0 | — | — | — | — |
| | Urethane resin particle D | — | — | — | — | — | 3.0 | — | — |
| | Urethane resin particle E | — | 3.0 | — | — | 3.0 | — | — | — |
| | Urethane resin particle F | — | — | 3.0 | — | — | — | 3.0 | — |
| | Urethane resin particle G | 3.0 | — | — | — | — | | — | 3.0 |
| | Propylene glycol | 20.0 | 20.0 | 20.0 | 20.0 | 20.0 | 20.0 | 20.0 | 20.0 |
| | TEGMBE | 8.0 | 8.0 | 8.0 | 8.0 | 8.0 | 8.0 | 8.0 | 8.0 |
| | Surfactant | 0.3 | 0.3 | 0.3 | 0.3 | 0.3 | 0.3 | 0.3 | 0.3 |
| | Ion exchanged water | Remainder | | | | | | | |
| | Total | 100.0 | | | | | | | |

For the ink sets according to Examples 1 to 8 and Comparative Examples 1 to 8, the rubfastness and adhesion to the recording medium of a formed image and the ejection stability of the first ink (white ink) and second ink (black ink) were evaluated by the following method. The evaluation results are shown in the following Tables 4 to 5.

[Evaluation Device]

As an evaluation device, a line-head inkjet recording apparatus (tester manufactured by KYOCERA Document Solutions Inc.) was used. The evaluation device was equipped with a plurality of recording heads ("KJ4B-HD06MHG-STDV" manufactured by KYOCERA Corporation) disposed in parallel along the printing direction and a conveyance table. Each recording head was equipped with 2656 nozzles. The recording head was set to an applied voltage of 21 V, a drive frequency of 20 kHz, an ejected droplet amount of 3 μL, a head temperature of 32° C., a resolution of 600 dpi, and the number of times of flushing before ejection of 1000. When forming an image using the evaluation device, the conveyance table was warmed to 40° C. in advance. Further, when forming an image using the evaluation device, the conveying speed of the image was set to 30 m/min.

One of the plurality of recording heads included in the evaluation device was filled with the white ink shown in Tables 2 to 3. This recording head was used as a white ink recording head (first recording head). Another recording head present downstream of the white ink recording head in the conveying direction was filled with the black ink shown in Tables 2 to 3. This recording head was used as a black ink recording head (second recording head).

As non-absorbent recording media, an OPP film ("FOR-AQ" manufactured by FUTAMURA CHEMICAL CO., LTD., one-sided corona discharge treatment) and a PET film ("FE2000" manufactured by FUTAMURA CHEMICAL CO., LTD., no surface treatment) were used. Note that in the formation of an image on the OPP film, the image was formed on the side of the OPP film on which corona discharge treatment was performed.

[Adhesion]

The white ink was ejected to the recording medium (OPP film or PET film) using the white ink recording head of the evaluation device to print a white solid image (coverage rate of 100%) as a base on the recording medium. After that, the black ink was ejected on the white solid image using the black ink recording head of the evaluation device to print a black solid image (coverage rate of 100%) on the recording medium in a superimposed manner. After that, the recording medium was dried at 110° C. for 20 minutes. After that, the recording medium was allowed to stand for 24 hours. The recording medium after standing was used as an evaluation sheet.

Adhesive tape ("Cellulose Tape (registered trademark) CT-18S" manufactured by NICHIBAN Co., Ltd.) was applied onto the black solid image of the evaluation sheet and peeled off at an angle of approximately 60 degrees. The adhesive tape was peeled off at a speed where the time from the start of peeling to the end of peeling was 1 second. After the adhesive tape was peeled off, the solid image on the evaluation sheet was visually observed to check the presence or absence of peeling of the black solid image. The ratio (peeling ratio [area %]) of the area of the black solid image peeled off together with the adhesive tape with respect to 100 area % of the region of the black solid image to which the adhesive tape was attached was calculated. The adhesion to the recording medium was judged in accordance with the following criteria.

(Criteria for Evaluating Adhesion)

A (extremely good): no peeling of the black solid image (peeling ratio of 0 area %).

B (good): the peeling ratio is more than 0 area % and less than 50 area %.

C (poor): the peeled ratio is 50 area % or more.

[Rubfastness]

An evaluation sheet (OPP film) was created in the same manner as in the evaluation of adhesion. Copy paper ("CC90" manufactured by Mondi plc) (hereinafter, referred to as evaluation paper in some cases) was placed on the evaluation sheet. Next, a rectangular parallelepiped weight (mass of 1 kg) with the dimension of the bottom surface of 5 cm×4 cm was placed on the evaluation paper. The position of the placed weight was set to the position directly above the black solid image. Next, the evaluation paper was caused to move horizontally by holding both ends of the evaluation paper. In the horizontal movement, the weight was caused to move back and forth five times above the black solid image. In this way, the black solid image was rubbed against the evaluation paper with a load of 1 kg. After that, the image density of the region of the evaluation paper that was in contact with the black solid image was measured using a reflection densitometer ("FD-9" manufactured by Konica Minolta, Inc.). The measurement conditions were an observation light source "D50", an illumination condition "M2", a field of view "2°", and a density status "I". Further, in the measurement, the image density of the region of the evaluation paper that was not in contact with the black solid image was used as the background value. The value (FD value) obtained by subtracting the background value from the measured image density was used as an evaluation value of rubfastness. The rubfastness was judged in accordance with the following criteria.

(Criteria for Evaluating Rubfastness)

A (good): the FD value is less than 0.02.

B (poor): the FD value is 0.02 or more.

[Ejection Stability of First Ink]

The white ink was ejected drop by drop from all nozzles of the first recording head (white ink recording head) to a sheet of printing paper ("C2" manufactured by FUJIFILM Business Innovation Corp., A4 size plain paper) using the evaluation device to form a dot line (stamp printing). The printing paper on which the dot line was formed was used as initial evaluation paper. Next, a white solid image (coverage rate of 100%) was continuously formed on 10000 sheets of printing paper ("C2" manufactured by FUJIFILM Business Innovation Corp., A4 size plain paper) using the evaluation device. Next, each recording head was caused to perform a purge operation and a wipe operation once (maintenance operation).

Immediately after performing the maintenance operation, a dot line was formed on a sheet of printing paper ("C2" manufactured by FUJIFILM Business Innovation Corp., A4 size plain paper). More specifically, one drop of the white ink was ejected from all nozzles of the recording head to a sheet of paper (stamp printing). The printing paper on which the dot line was formed in this way was used as evaluation paper after printing.

Each of the obtained initial evaluation paper and evaluation paper after printing was observed using an image analysis device ("high-speed and high-definition image processing/analysis system Dot Analyzer DA-6000" manufactured by Oji Scientific Instruments) to check the disarray of the dot line. More specifically, for all 2656 dots of the white pink formed on the initial evaluation paper, the width of the position deviation in the lateral direction of the evaluation paper and the width of the position deviation in the longitudinal direction of the evaluation paper were measured. From the measurement results, a number average value (3 σx [μm]) of the width of the position deviation in the lateral direction of the evaluation paper and a number average value (3 σy [μm]) of the width of the position deviation in the longitudinal direction of the evaluation paper were calculated. The width 3σ [μm] of the position deviation of the dot line formed on the initial evaluation paper was then calculated from the calculation formula "$3\sigma=3\sqrt{[(\sigma x)2+(\sigma y)^2]}$". This was used as 3σ of the initial evaluation paper. The same operation was performed on the evaluation paper after printing to calculate the width 3σ [μm] of the position deviation of the dot line formed on the evaluation paper after printing. This was used as 3σ of the evaluation paper after printing.

Next, a change amount 3σ [μm] of the width of the position deviation of the dot line formed on the evaluation paper before and after printing was calculated from the calculation formula "change amount 3σ=|(3σ of initial evaluation paper)−(3σ of evaluation paper after printing)|". The ejection stability was judged under the following criteria.

(Criteria for Ejection Stability)

A (good): the change amount 3σ is less than 3.0 μm

B (poor): the change amount 3σ is 3.0 μm or more

[Ejection Stability of Second Ink]

The ejection stability of the second ink was evaluated in the same manner as in the evaluation of ejection stability of a first ink except that the following points were changed. In the evaluation of the ejection stability of the second ink, the black ink was ejected from the second recording head (black ink recording head) instead of ejecting the white ink from the first recording head (white ink recording head).

TABLE 4

| | | Example | | | | | | | |
|---|---|---|---|---|---|---|---|---|---|
| | | 1 | 2 | 3 | 4 | 5 | 6 | 7 | 8 |
| Rubfastness | FD value | 0.02 | 0.01 | 0.00 | 0.02 | 0.01 | 0.02 | 0.02 | 0.02 |
| | Judgement | A | A | A | A | A | A | A | A |
| First ink | 3σ [μm] | 2.4 | 2.4 | 2.7 | 2.6 | 1.8 | 2.8 | 2.3 | 2.4 |
| Ejection stability | Judgement | A | A | A | A | A | A | A | A |
| Second ink | 3σ [μm] | 2.2 | 2.6 | 2.3 | 2.6 | 2.3 | 2.2 | 1.7 | 2.6 |
| Ejection stability | Judgement | A | A | A | A | A | A | A | A |
| Adhesion | PET | A | A | A | A | A | A | A | A |
| | OPP | A | A | A | A | A | A | A | A |

TABLE 5

| | | Comparative Example | | | | | | | |
|---|---|---|---|---|---|---|---|---|---|
| | | 1 | 2 | 3 | 4 | 5 | 6 | 7 | 8 |
| Rubfastness | FD value | 0.08 | 0.10 | 0.03 | 0.02 | 0.09 | 0.02 | 0.04 | 0.06 |
| | Judgement | B | B | B | A | B | A | B | B |
| First ink | 3σ [μm] | 2.4 | 2.4 | 2.4 | 2.3 | 2.4 | 2.6 | 2.6 | 2.5 |
| Ejection stability | Judgement | A | A | A | A | A | A | A | A |
| Second ink | 3σ [μm] | 7.2 | 15.0 | 2.8 | 2.2 | 15.2 | 2.6 | 2.8 | 7.3 |
| Ejection stability | Judgement | B | B | A | A | B | A | A | B |
| Adhesion | PET | A | A | A | A | A | C | C | A |
| | OPP | A | A | A | C | C | C | C | C |

As shown in Tables 1 to 5, each of the ink sets according to Examples 1 to 8 includes a first ink and a second ink. The first ink included a first pigment, a first binder resin particle, and a first aqueous medium. The second ink included a second pigment, a second binder resin particle, and a second aqueous medium. The first binder resin particle included a polyolefin resin. The breaking elongation of the first binder resin particle at 25° C. was greater than 60% and 750% or less. The second binder resin particle included a urethane resin. The breaking elongation of the second binder resin particle at 25° C. was 60% or less. Each of the ink sets according to Examples 1 to 8 had excellent ejection stability of each ink and were capable of forming an image having excellent rubfastness and adhesion to a recording medium.

On the other hand, in each of the ink sets according to Comparative Examples 1 to 3 and 8, the breaking elongation of the second binder resin particle included in the second ink at 25° C. exceeded 60%. It can be judged that the second binder resin particle having an excessively high breaking elongation is difficult to impart rubfastness to a formed image. As a result, in each of the ink sets according to Comparative Examples 1 to 3 and 8, the rubfastness of a formed image was evaluated as poor. Further, in the ink set according to Comparative Example 8, the adhesion of a formed image to the recording medium was also evaluated as poor. Further, it can be judged that the second binder resin particle having a significantly high breaking elongation reduces the ejection stability of the second ink. As a result, in each of the ink sets according to Comparative Examples 1, 2, and 8, the ejection stability of the second ink was evaluated as poor.

In each of the ink sets according to Comparative Examples 4 and 6, the first ink included not a polyolefin resin particle but a urethane resin particle. It can be judged that the first ink using a urethane resin particle could not form a white image (base) having excellent adhesion to a non-absorbent recording medium. As a result, in each of the ink sets according to Comparative Examples 4 and 6, the adhesion of a formed image to the recording medium was evaluated as poor.

In each of the ink sets according to Comparative Examples 5 and 7, the breaking elongation of the second binder resin particle included in the second ink at 25° C. exceeded 60%. It can be judged that the second binder resin particle having an excessively high breaking elongation is difficult to impart rubfastness to a formed image. Further, in each of the ink sets according to Comparative Examples 5 and 7, the first ink included not a polyolefin resin particle but a urethane resin particle. It can be judged that the first ink using a urethane resin particle could not form a white image (base) having excellent adhesion to a non-absorbent recording medium. As a result, in each of the ink sets according to Comparative Examples 5 and 7, the rubfastness and adhesion to the recording medium of a formed image was evaluated as poor. Further, in the ink set according to Comparative Example 5, the ejection stability of the second ink was also evaluated as poor.

It should be understood by those skilled in the art that various modifications, combinations, sub-combinations and alterations may occur depending on design requirements and other factors insofar as they are within the scope of the appended claims or the equivalents thereof.

What is claimed is:

1. An inkjet ink set, comprising:

a first ink; and a second ink, the first ink including a first pigment, a first binder resin particle, and a first aqueous medium, the second ink including a second pigment, a second binder resin particle, and a second aqueous medium, the first binder resin particle including a polyolefin resin, a breaking elongation of the first binder resin particle at 25° C. being greater than 60% and 750% or less, the second binder resin particle including a urethane resin, a breaking elongation of the second binder resin particle at 25° C. being 60% or less.

2. The inkjet ink set according to claim 1, wherein the polyolefin resin has a glass transition temperature of 80° C. or more and 130° C. or less, and the urethane resin has a glass transition temperature of 60° C. or more and 90° C. or less.

3. The inkjet ink set according to claim 1, wherein each of the first ink and the second ink further includes a silicone surfactant.

4. The inkjet ink set according to claim 1, wherein a content ratio of the first binder resin particle in the first ink is 1.0 mass % or more and 8.0 mass % or less, and a content ratio of the second binder resin particle in the second ink is 1.0 mass % or more and 8.0 mass % or less.

5. The inkjet ink set according to claim 1, wherein the first ink is a white ink, and the second ink is a color ink.

6. The inkjet ink set according to claim 1, wherein the first ink is an ink for a base, and the second ink is an ink for ejection on the base.

7. The inkjet ink set according to claim 1, wherein the first ink and the second ink are used for printing on a non-absorbent recording medium.

8. The inkjet ink set according to claim 1, wherein a number average primary particle size of the first binder resin particle is 10 nm or more and 100 nm or less, and a number average primary particle size of the second binder resin particle is 10 nm or more and 100 nm or less.

9. An inkjet recording apparatus, comprising:

the inkjet ink set according to claim 1;

a first recording head that ejects the first ink to a recording medium; and a second recording head that ejects the second ink to at least part of a region of the recording medium to which the first ink has been ejected, the recording medium being a non-absorbent recording medium.

10. An inkjet recording method, comprising:

a first step of ejecting the first ink to a recording medium using the inkjet ink set according to claim 1; and a second step of ejecting the second ink to at least part of a region of the recording medium to which the first ink has been ejected, the recording medium being a non-absorbent recording medium.

* * * * *